US011152689B2

(12) United States Patent
Sudo et al.

(10) Patent No.: US 11,152,689 B2
(45) Date of Patent: Oct. 19, 2021

(54) IN-VEHICLE WIRELESS DISPLAY AND IN-VEHICLE DISPLAY SYSTEM

(71) Applicant: Mitsubishi Electric Corporation, Tokyo (JP)

(72) Inventors: Akitoshi Sudo, Tokyo (JP); Atsuhiko Nagamune, Tokyo (JP); Tomotaka Kaneda, Tokyo (JP); Takashi Yanagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 81 days.

(21) Appl. No.: 16/495,956

(22) PCT Filed: Mar. 28, 2017

(86) PCT No.: PCT/JP2017/012587
§ 371 (c)(1),
(2) Date: Sep. 20, 2019

(87) PCT Pub. No.: WO2018/179080
PCT Pub. Date: Oct. 4, 2018

(65) Prior Publication Data
US 2020/0144706 A1 May 7, 2020

(51) Int. Cl.
*H01Q 21/12* (2006.01)
*H01Q 1/24* (2006.01)
(Continued)

(52) U.S. Cl.
CPC ............. *H01Q 1/32* (2013.01); *H01Q 13/10* (2013.01); *H04B 1/3822* (2013.01); *H04N 5/64* (2013.01); *H04N 7/04* (2013.01)

(58) Field of Classification Search
None
See application file for complete search history.

(56) References Cited

U.S. PATENT DOCUMENTS 7,354,091 B2 * 4/2008 Lavelle .................... B60N 2/64
296/37.15
8,078,346 B2 * 12/2011 Newton ................ B60T 17/228
701/19
(Continued)

FOREIGN PATENT DOCUMENTS

JP    2002084117 A    3/2002
JP    2011098705 A    5/2011
(Continued)

OTHER PUBLICATIONS

International Search Report (with English translation) and Written Opinion issued in corresponding International Patent Application No. PCT/JP2017/012587, 7 pages dated (Jun. 27, 2017).
(Continued)

*Primary Examiner* — Tuan A Tran
(74) *Attorney, Agent, or Firm* — Buchanan Ingersoll & Rooney PC

(57) ABSTRACT

An in-vehicle wireless display includes a slot antenna to transmit and receive data, a nonmagnetic member provided apart from a slot formed in the slot antenna, to cover the slot, and a display unit installed in a vehicle constituting a train, to display information on the basis of data received by the slot antenna.

17 Claims, 7 Drawing Sheets

(51) Int. Cl.
*H01Q 9/06* (2006.01)
*H01Q 19/10* (2006.01)
*H01Q 21/30* (2006.01)
*H01Q 1/32* (2006.01)
*H01Q 13/10* (2006.01)
*H04B 1/3822* (2015.01)
*H04N 5/64* (2006.01)
*H04N 7/04* (2006.01)

(56) References Cited

U.S. PATENT DOCUMENTS

| | | | | |
|---|---|---|---|---|
| 8,223,082 | B2* | 7/2012 | Chiang | H01Q 1/2266 |
| | | | | 343/767 |
| 8,294,620 | B2* | 10/2012 | Flint | H01Q 1/2275 |
| | | | | 343/702 |
| 8,665,164 | B2* | 3/2014 | Hill | H01Q 5/342 |
| | | | | 343/767 |
| 8,872,716 | B2* | 10/2014 | Kinoshita | H01Q 1/52 |
| | | | | 343/803 |
| 9,035,846 | B2* | 5/2015 | Liang | H01Q 19/108 |
| | | | | 343/815 |
| 9,490,526 | B2* | 11/2016 | Rivera | G02F 1/136286 |
| 9,627,769 | B2* | 4/2017 | Koo | H01Q 1/2266 |
| 9,854,629 | B2* | 12/2017 | Ikeda | H05B 33/12 |
| 10,133,462 | B2* | 11/2018 | Nishioka | G06F 3/14 |
| 10,581,168 | B2* | 3/2020 | Koshi | H01Q 21/28 |
| 2002/0021250 | A1 | 2/2002 | Asano et al. | |
| 2007/0063924 | A1* | 3/2007 | Yau | G06F 3/1431 |
| | | | | 345/2.3 |
| 2007/0194994 | A1* | 8/2007 | Waltho | H01Q 13/10 |
| | | | | 343/702 |
| 2009/0179805 | A1* | 7/2009 | Roy | H01Q 1/243 |
| | | | | 343/702 |
| 2011/0151780 | A1* | 6/2011 | Hood, III | H01Q 1/44 |
| | | | | 455/41.1 |
| 2012/0007783 | A1 | 1/2012 | Taura | |
| 2014/0240177 | A1* | 8/2014 | Wang | H01Q 1/2266 |
| | | | | 343/702 |
| 2017/0279200 | A1* | 9/2017 | Koshi | H01Q 1/24 |

FOREIGN PATENT DOCUMENTS

| | | |
|---|---|---|
| JP | 2012076681 A | 4/2012 |
| JP | 2016009365 A | 1/2016 |
| WO | 2005013500 A1 | 2/2005 |
| WO | 2006072611 A1 | 7/2006 |

OTHER PUBLICATIONS

Extended European Search Report dated Jun. 25, 2020 for corresponding European patent application No. 17904171.0, 11 pages.
Office Action dated Dec. 31, 2020, for corresponding Indian patent Application No. 201927038087, 7 pages.

* cited by examiner

IN-VEHICLE WIRELESS DISPLAY AND IN-VEHICLE DISPLAY SYSTEM

FIELD

The present invention relates to an in-vehicle wireless display and an in-vehicle display system installed in vehicles constituting a train.

BACKGROUND

In recent years, in railway vehicles, displays have been disposed in the vehicles to provide information to passengers. A technique to transmit information such as moving images to information displays via transmission lines in such an in-vehicle information transmission system has been disclosed (see Patent Literature 1, for example).

CITATION LIST

Patent Literature

Patent Literature 1: Japanese Patent Application Laid-open No. 2011-098705

SUMMARY

Technical Problem

However, conventional in-vehicle displays as those in Patent Literature 1 have a problem in that in-vehicle displays and a terminal device installed in a vehicle are connected via transmission lines to be able to communicate with each other, so that the number of wires is large, and outfitting cost is increased.

The present invention has been made to solve the above problem. It is an object of the present invention to provide an in-vehicle wireless display capable of reducing the number of wires and reducing outfitting cost, compared to conventional ones.

Solution to Problem

In order to achieve the object, an in-vehicle wireless display according to an aspect of the present invention includes: a slot antenna to transmit and receive data; a nonmagnetic member provided apart from a slot formed in the slot antenna, to cover the slot; and a display unit installed in a vehicle constituting a train, to display information on a basis of data received by the slot antenna.

Advantageous Effects of Invention

The in-vehicle wireless display according to the present invention can wirelessly transmit and receive data in the vehicle using a slot antenna, and thus can reduce the number of wires and reduce outfitting cost.

DESCRIPTION OF EMBODIMENTS

Hereinafter, embodiments of an in-vehicle wireless display according to the present invention will be described with reference to the drawings.

First Embodiment

Figure 1:
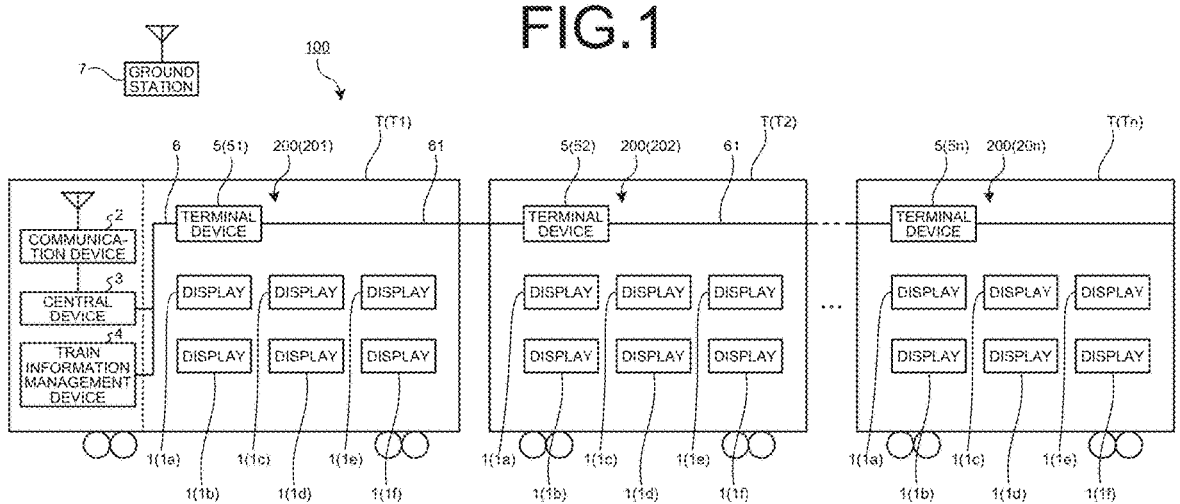
FIG. 1 is a diagram illustrating an example of the system configuration of an entire train equipped with in-vehicle wireless displays according to a first embodiment of the present invention.

FIG. 1 is a diagram illustrating an example of the system configuration of a train 100 including vehicles T1 to Tn (n is any natural number) in each of which a plurality of in-vehicle wireless displays (hereinafter referred to as displays) 1 according to a first embodiment is installed. As illustrated in FIG. 1, an in-vehicle display system 201 (200) mounted on the vehicle T1 that is the front vehicle includes a communication device 2, a central device 3 connected to the communication device 2, a train information management device 4 connected to the central device 3, a terminal device 5 (51) connected to the central device 3 and the train information management device 4, and displays 1a to 1f that wirelessly communicate with the terminal device 5 (51). An in-vehicle display system 202 mounted on the vehicle T2 coupled to the vehicle T1 includes a terminal device 52 connected to the terminal device 51 installed in the vehicle T1 via a transmission line 61, and displays 1a to 1f. Likewise, an in-vehicle display system 20n mounted on the vehicle Tn includes a terminal device 5n and displays 1a to 1f. In the train 100, the terminal devices 51 to 5n installed in the vehicles T1 to Tn, respectively, are interconnected via the transmission line 61.

The communication device 2 mounted on the vehicle T1 is for performing wireless communication between the vehicle and the ground, and transmits and receives data to and from a ground station 7 installed at a station or the like. The communication device 2 wirelessly communicates with the ground station 7 to receive data or the like to be delivered to the vehicles T1 to Tn. The communication device 2 transmits data or the like on the train 100 to the ground station 7 as necessary. Data received by the communication device 2 from the ground station 7 includes, for example, data such as operation information on the route along which the train 100 is traveling and neighboring routes, news, weather forecasts, and emergency information. Data transmitted by the communication device 2 to the ground station 7 includes, for example, data such as train information on the train 100 acquired from the train information management device 4. When the communication device 2, which is connected to the central device 3, receives data from the ground station 7, it outputs the data to the central device 3.

The central device 3 delivers data acquired from the ground station 7 via the communication device 2, display data that it holds in advance, or the like to the terminal devices 51 to 5n of the vehicles T1 to Tn. The central device 3 is connected to the terminal device 51 of the vehicle T1 via a transmission line 6. When the central device 3 acquires data that has been wirelessly received by the communication device 2 from the ground station 7, the central device 3 delivers the data to the terminal device 51 and the terminal devices 52 to 5n of the following vehicles T2 to Tn via the transmission line 6 and the transmission line 61. The central device 3 holds in advance moving image data, still image data, or the like for advertisement display to be displayed on the displays 1a to 1f installed in the vehicles T1 to Tn, for example. The central device 3 delivers the held data at predetermined timings to the terminal device 51 of the vehicle T1 and the terminal devices 52 to 5n of the following vehicles T2 to Tn via the transmission line 6 and the transmission line 61.

The train information management device 4 collects data from on-board equipment (not illustrated) mounted on the vehicles T1 to Tn and manages it, for example. The data on the on-board equipment collected by the train information management device 4 includes, for example, data on doors, air conditioners, brakes, motors, SIVs (auxiliary power units), etc. The train information management device 4 manages these pieces of data as train information. The train information management device 4 delivers the managed data to the terminal devices 51 to 5n via the transmission line 6 and the transmission line 61 as necessary. For example, when the train information management device 4 receives a request from the terminal device 51, the train information management device 4 delivers data indicating contents requested to the request-originating terminal device 51.

Figure 3:
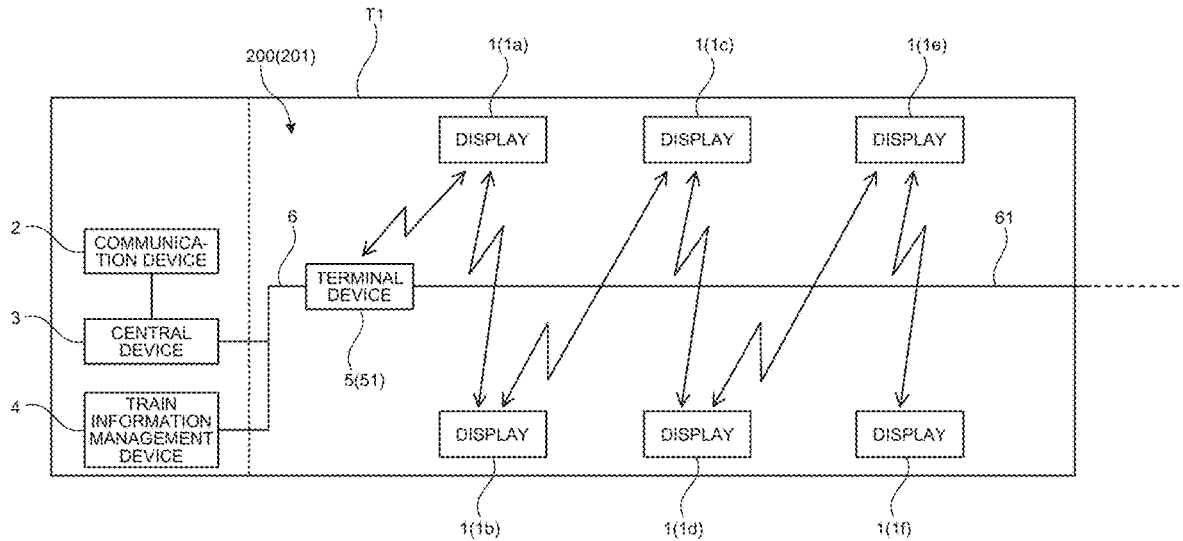
FIG. 3 is a diagram illustrating an example of the flow of data in a vehicle equipped with the in-vehicle wireless displays according to the first embodiment of the present invention.

The terminal devices 51 to 5n installed in the vehicles T1 to Tn are interconnected via the transmission line 61. The terminal device 51 installed in the front vehicle T1 is connected to the central device 3 via the transmission line 6. When the terminal device 51 receives data from the central device 3, it transfers the data to the adjacent following vehicle T2 via the transmission line 61. The terminal device 51 includes a wireless communication antenna (not illustrated). As illustrated in FIG. 3, the terminal device 51 transmits data to the display 1a installed in the vehicle T1 by wireless communication. When the terminal devices 52 to 5n installed in the vehicles T2 to Tn different from the vehicle T1 in which the central device 3 is installed receive data output from the central device 3 and transferred from the other terminal devices 5 via the transmission line 61, the terminal devices 52 to 5n each transfer the data to the adjacent following vehicle T if the adjacent following vehicle T is present. The terminal devices 52 to 5n include a wireless communication antenna in a similar manner to the terminal device 51, and transmit data to the displays 1a installed in the vehicles T2 to Tn by wireless communication. Data transmitted from the terminal devices 51 to 5n to the displays 1a in the vehicles T1 to Tn is data for causing the displays 1a to 1f in the vehicles T1 to Tn to display information, and includes, for example, data such as operation information, news, and weather forecasts transmitted from the ground station 7, data for advertisement display held in advance in the central device 3, data collected by the train information management device 4 from the on-vehicle equipment mounted on the vehicles T1 to Tn, and control information for causing the displays 1a to 1f to display information on the basis of these pieces of data. The control information is, for example, information for indicating the timing and content of information to be displayed on the displays 1a to 1f. Although FIG. 1 illustrates an example in which the terminal devices 51 to 5n installed in the vehicles T1 to Tn are interconnected via the transmission line 61 to transfer data between the vehicles, the terminal devices 51 to 5n may be provided with a wireless function to transfer data between the vehicles by radio, instead of the transmission line 61.

Figure 2:
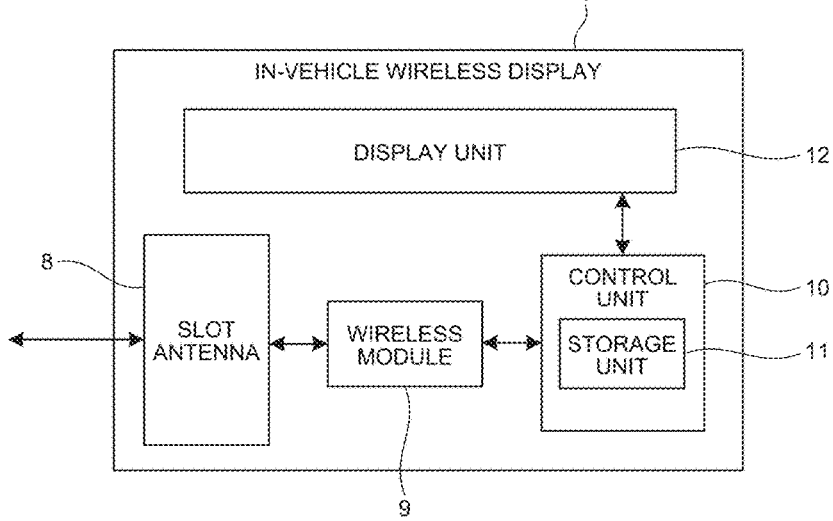
FIG. 2 is a diagram illustrating an example of the schematic internal configuration of each in-vehicle wireless display according to the first embodiment of the present invention.

FIG. 2 is a diagram illustrating an example of the schematic internal configuration of the displays 1 (1a to 1f) installed in the vehicles T1 to Tn. The displays 1 are for providing passengers with various kinds of information such as operation information and advertisements, on the basis of data delivered from the terminal devices 51 to 5n. As illustrated in FIG. 2, the display 1, for example, includes a slot antenna 8 that receives data delivered from a corresponding one of the terminal devices 51 to 5n or transmits data from the display 1, a wireless transmitting/receiving unit 9 connected to the slot antenna 8, a control unit 10 connected to the wireless transmitting/receiving unit 9, a storage unit 11 included in the control unit 10, and a display unit 12 connected to the control unit 10.

The slot antenna 8 is for transmitting and receiving data to and from the terminal device 5 or other displays 1 in the same vehicle T. Data received by the slot antenna 8 is output to the control unit 10 via the wireless transmitting/receiving unit 9. The wireless transmitting/receiving unit 9 has a function as a transmitting/receiving unit that outputs data received by the slot antenna 8 to the control unit 10, and receives from the control unit 10 data to be transmitted from the slot antenna 8 to the terminal device 5 or other displays 1 in the same vehicle T and outputs it to the slot antenna 8.

The control unit 10 includes, for example, a Central Processing Unit (CPU) and the storage unit 11, and executes various controls on the display unit 12 according to predetermined programs stored in the storage unit 11. In the storage unit 11, for example, information for information display that is information with a relatively small capacity, such as operation information on the route along which the train 100 is traveling and neighboring routes and emergency information, may be stored individually. The control unit 10 generates information to be displayed on the display unit 12, on the basis of data delivered from the terminal device 5 in the same vehicle T and received by the slot antenna 8, and transmits the information to the display unit 12. The display unit 12 is formed, for example, of a liquid crystal display, and displays information sent from the control unit 10.

The displays 1a to 1f are disposed, for example, on lintels of doors or the like in the vehicle T. FIG. 3 illustrates an example of the flow of data in the vehicle T1, and schematically illustrates an example of the case where the displays 1a to 1f are disposed on lintels of doors of a six-door-type vehicle. In the vehicle T1, as illustrated in FIG. 3, the terminal device 51 is disposed on the front side of the vehicle T1 in the traveling direction (left direction in FIG. 3). First, data is transferred to the following vehicle T2 via the transmission line 61, and the data is transmitted to the display 1a, which is one of the displays 1a and 1b located closest to the terminal device 51, by wireless communication.

When the display 1a receives the data transmitted from the terminal device 51 with the slot antenna 8, it displays information on the display unit 12 on the basis of the received data, and transmits, with the slot antenna 8, the data received from the terminal device 51 to the display 1b disposed on the lintel of the door facing the lintel of the door on which the display 1a is disposed. When the display 1b receives the data transmitted from the display 1a with the slot antenna 8, it displays information on the display unit 12 on the basis of the received data, and transmits, with the slot antenna 8, the data received from the display 1a to the display 1c disposed on the lintel of the door located on the same wall side as the lintel of the door on which the display 1a is disposed and adjacent to the display 1a on the rear side in the traveling direction.

When the display 1c receives the data transmitted from the display 1b with the slot antenna 8, it displays information on the display unit 12 on the basis of the received data, and, in a similar manner to the display 1a, transmits, with the slot antenna 8, the data received from the display 1b to the display 1d disposed on the lintel of the door facing the lintel of the door on which the display 1c is disposed. When the display 1d receives the data transmitted from the display 1c with the slot antenna 8, it displays information on the display unit 12 on the basis of the received data, and, in a similar manner to the display 1b, transmits, with the slot antenna 8, the data received from the display 1c to the display 1e disposed on the lintel of the door located on the same wall side as the lintel of the door on which the display 1c is disposed and adjacent to the display 1c on the rear side in the traveling direction.

When the display 1e receives the data transmitted from the display 1d with the slot antenna 8, it displays information on the display unit 12 on the basis of the received data, and, in a similar manner to the displays 1a and 1c, transmits, with the slot antenna 8, the data received from the display 1d to the display 1f disposed on the lintel of the door facing the lintel of the door on which the display 1e is disposed. When the display 1f receives the data transmitted from the display 1e with the slot antenna 8, it displays information on the display unit 12 on the basis of the received data.

As described above, in the vehicle T1, data delivered from the terminal device 51 is transferred from the display 1a to the display 1f successively by wireless communication using the slot antennas, so that various kinds of information are displayed on the display units 12 of the displays 1a to 1f, on the basis of the data delivered from the terminal device 51.

Figure 4:
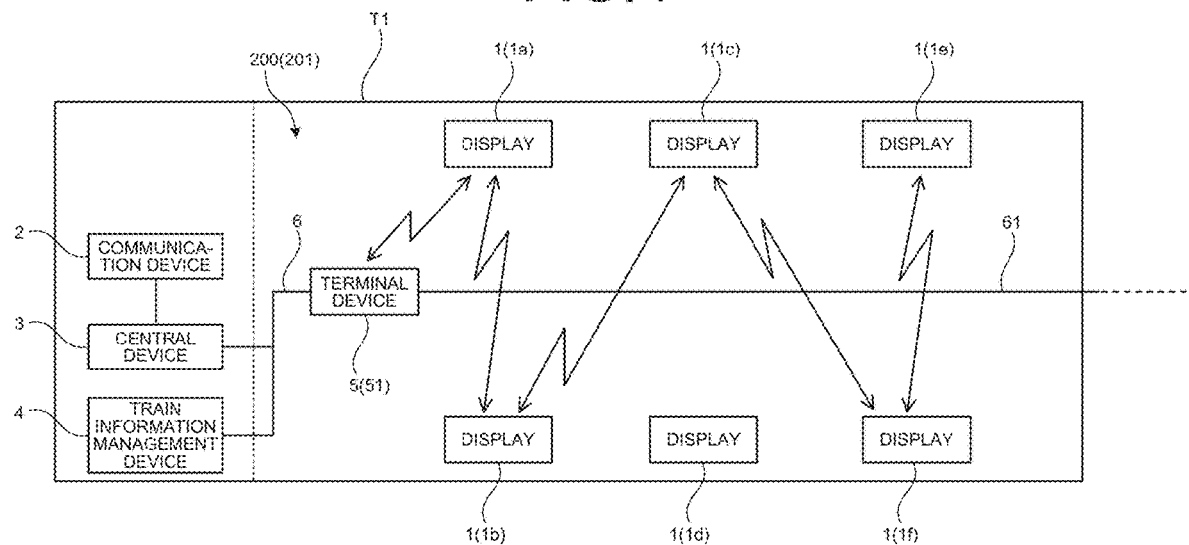
FIG. 4 is a diagram illustrating an example of the flow of data in the vehicle equipped with the in-vehicle wireless displays according to the first embodiment of the present invention.

In the vehicle T1 equipped with the displays 1a to 1f according to the first embodiment, if, for example, the display 1d breaks down, as illustrated in FIG. 4, the display 1c that transmits data to the display 1d in normal times can transmit data with the slot antenna 8 to the display 1f disposed on the lintel of the door located on the same wall side as the lintel of the door on which the display 1d is disposed and adjacent to the display 1d on the rear side in the traveling direction. In this case, the display 1f displays information on the display unit 12 on the basis of the data received from the display 1c, and transmits, with the slot antenna 8, the data received from the display 1c to the display 1e disposed on the lintel of the door facing the lintel of the door on which the display 1f is disposed.

Although FIGS. 3 and 4 illustrate an example of the terminal device 51 and the displays 1a to 1f disposed in the vehicle T1, the flow of data in the vehicles T2 to Tn is basically the same as that in the vehicle T1 except that the terminal device 51 receives data directly from the central device 3 and the train information management device 4 via the transmission line 6. FIG. 3 illustrates an example of the case where the displays 1a to 1f are disposed on the lintels of the doors of the six-door-type vehicle T1. In four-door-type and eight-door-type vehicles, data can be transferred likewise. The number of doors of the vehicle T is not particularly limited. The number of displays 1 disposed does not necessarily need to agree with the number of doors. Further, positions in which the displays 1 are disposed are not limited to particular ones. For example, the displays 1 may be disposed on lintels of doors provided at the front and rear of a vehicle to allow coming and going between vehicles, or on the ceiling over the passage in a vehicle.

Figure 5:
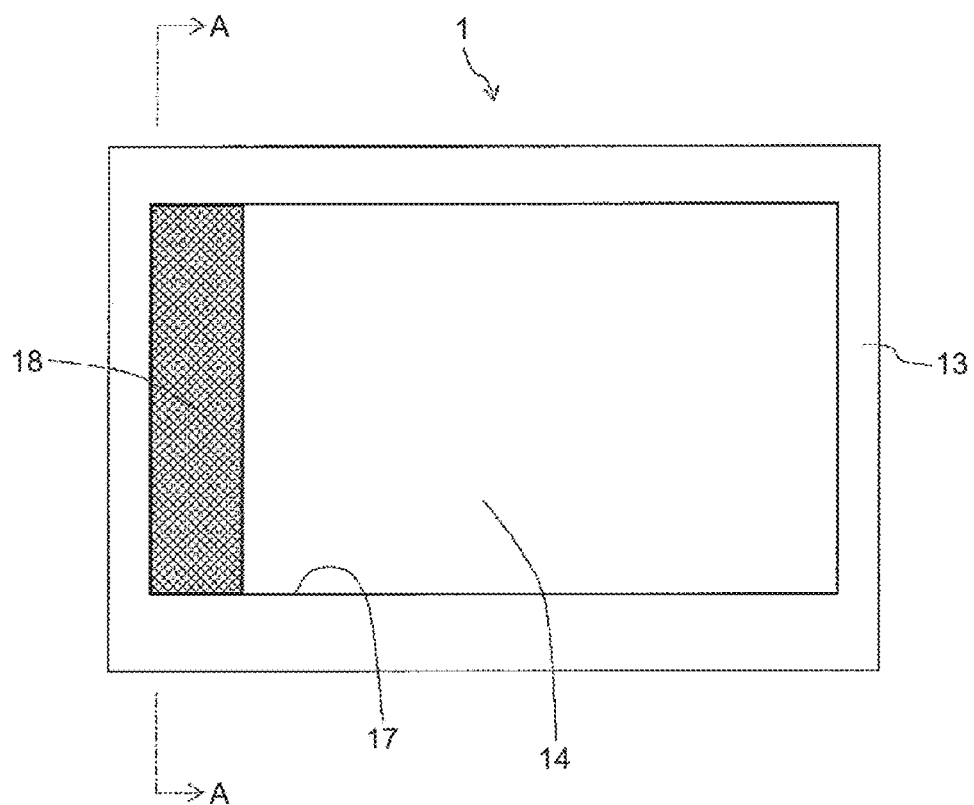
FIG. 5 is a diagram illustrating an example of the appearance of each in-vehicle wireless display according to the first embodiment of the present invention.
Figure 6:
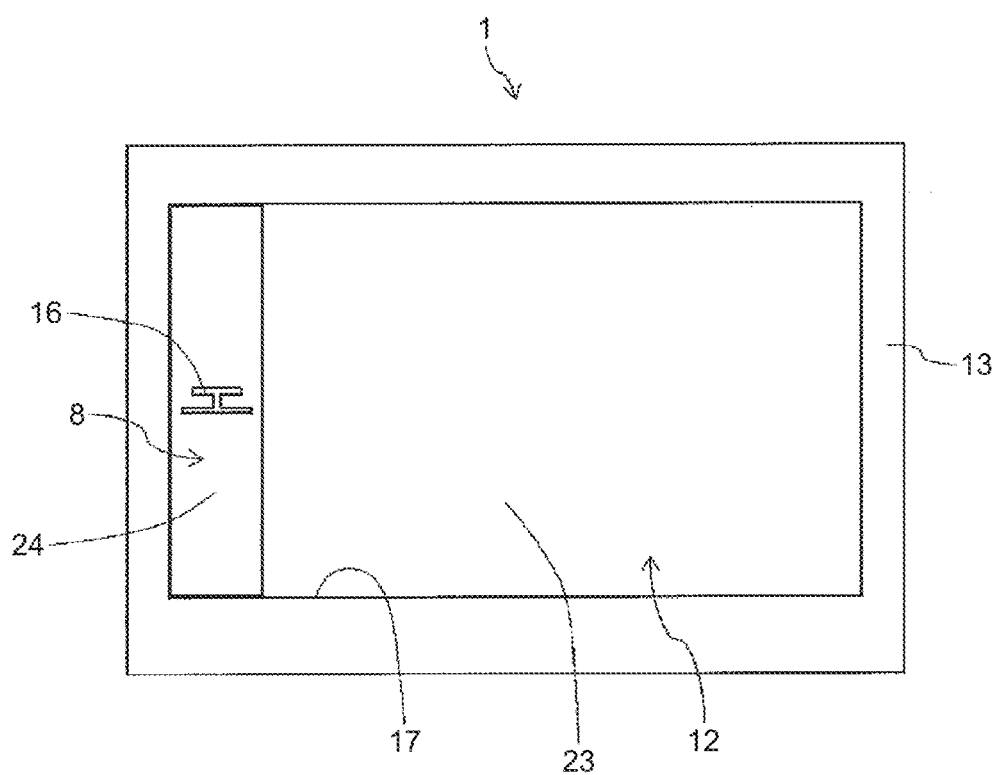
FIG. 6 is a diagram illustrating an example of the appearance of each in-vehicle wireless display according to the first embodiment of the present invention, with a nonmagnetic member removed.
Figure 7:
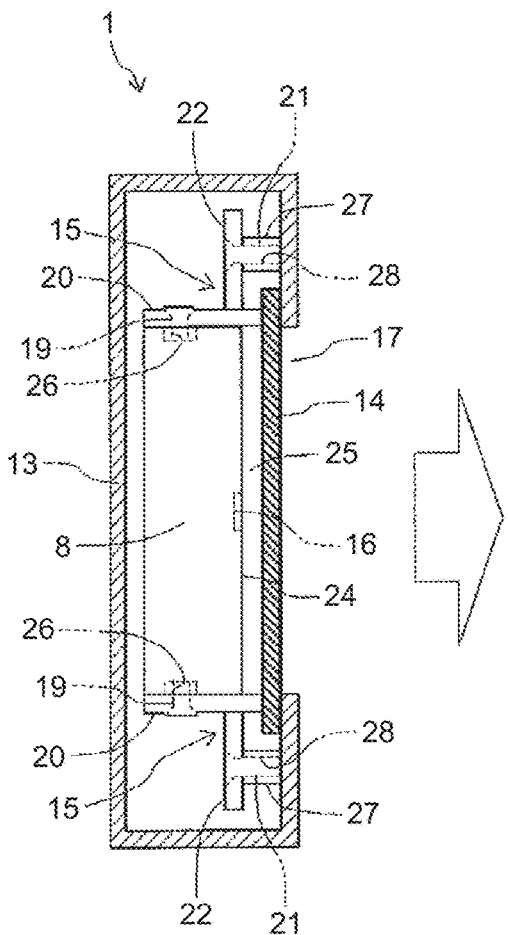
FIG. 7 is a cross-sectional view illustrating an example of the internal structure of each in-vehicle wireless display according to the first embodiment of the present invention.

Next, the schematic structure of the display 1 according to the first embodiment will be described with reference to FIGS. 5 to 7. FIG. 5 is a diagram illustrating an example of the appearance of the display 1 as viewed from the side where a display surface 23 is present. FIG. 6 is a diagram illustrating an example of the appearance of the display 1 with a nonmagnetic member 14 described later removed, as viewed from the side where the display surface 23 is present. FIG. 7 is a cross-sectional view taken along line A-A in FIG. 5 and illustrates an example of the internal structure of the display 1.

As illustrated in FIGS. 5 to 7, the display 1 includes the slot antenna 8, the display unit 12 provided adjacent to the slot antenna 8, a casing 13 housing the slot antenna 8 and the display unit 12, the nonmagnetic member 14 provided to cover the slot antenna 8, and spacers 15 keeping the slot antenna 8 and the nonmagnetic member 14 apart.

The slot antenna 8 is a wireless communication antenna. As illustrated in FIGS. 6 and 7, the slot antenna 8 is a metal plate formed with a slot 16. As indicated by an arrow in FIG. 7, the slot antenna 8 emits radio waves toward the front of a surface 24 in which the slot 16 is formed. The slot 16 is an elongated slit formed in the center of the metal plate. As illustrated in FIG. 6, for example, the slot 16 includes two parallel slits extending laterally in FIG. 6 and one slit extending vertically in FIG. 6 to connect the centers of the two parallel slits. Of the two parallel slits of the slot 16 extending laterally, the slit located on the upper side in FIG. 6 is made shorter than the slit located on the lower side. The slot of the slot antenna 8 is not limited to a particular shape. For example, an L-shaped slot or the like may be formed. Further, the slot 16 of the slot antenna 8 is not particularly limited in number. For example, a plurality of slots of different shapes may be formed in a metal plate to correspond to a plurality of frequencies.

The display unit 12 is formed of a liquid crystal display as described above. As illustrated in FIG. 6, the display unit 12 is disposed side by side with the slot antenna 8 such that the display surface 23 to display information has the same orientation as the surface 24 of the slot antenna 8 in which the slot 16 is formed.

The casing 13 is made of metal, and houses the slot antenna 8 and the display unit 12. The casing 13 has an opening 17 on the side facing the display surface 23 of the display unit 12 and the slot 16 of the slot antenna 8. That is, the display surface 23 of the display unit 12 and the slot 16 of the slot antenna 8 are housed in the casing 13 such that they face toward the opening 17 of the casing 13. The slot antenna 8 is housed in the casing 13 such that it is located to the side of the display unit 12.

The nonmagnetic member 14 allows radio waves emitted from the slot 16 to pass through it, and is provided apart from the slot 16 of the slot antenna 8 to cover the slot 16 as illustrated in FIG. 7. As illustrated in FIG. 5, the nonmagnetic member 14 is extended to cover the display surface 23 of the display unit 12, and is provided to protect the display surface 23 of the display unit 12 and close the opening 17 of the casing 13. As the nonmagnetic member 14, for example, glass (particularly tempered glass) can be suitably used in terms of incombustibility, but the nonmagnetic member 14 is not limited to this. A nonmagnetic member such as a film or polycarbonate may be used.

A masked portion 18 that has been subjected to masking is formed on a region of the nonmagnetic member 14 facing the surface 24 of the slot antenna 8 in which the slot 16 is formed, as indicated by hatching in FIG. 5. The masked portion 18 may be formed on either the inner surface of the nonmagnetic member 14 located on the slot antenna 8 side or the outer surface of the nonmagnetic member 14 located on the opening 17 side of the casing 13. In FIG. 7, the masked portion 18 is not illustrated. For the masking, for example, a masking film may be attached, or an opaque material such as black ink may be applied. The masking is not limited to a particular one, and may be any processing that can reduce visibility when the inside of the casing 13 is viewed from the outside, and allows radio waves emitted from the slot 16 to pass through. Although the display 1 according to the present embodiment shows an example in which the masked portion 18 is formed on the region of the nonmagnetic member 14 facing the surface 24 of the slot antenna 8 in which the slot 16 is formed, the masking may not be performed.

As illustrated in FIG. 7, the spacers 15 are for supporting the slot antenna 8 such that the slot 16 is kept apart from the nonmagnetic member 14, and are provided as a pair at an upper portion and a lower portion of the slot antenna 8. Each spacer 15 includes a support portion 20 that is fixed to the slot antenna 8 via a fixing screw 19, thereby supporting the slot antenna 8, and a fixed portion 22 that is fixed to an inner portion of the casing 13 via a fixing screw 21.

The support portion 20 is formed in a plate shape to abut on the upper surface or the lower surface of the slot antenna 8 as illustrated in FIG. 7. The edge of the support portion 20 located on the opening 17 side of the casing 13 extends toward the opening 17 beyond the surface 24 in which the slot 16 is formed, and supports the nonmagnetic member 14 such that it presses the nonmagnetic member 14 from the back side against the inner surface of the casing 13. Consequently, in the display 1, a space 25 is provided between the surface 24 in which the slot 16 is formed and the inner surface of the nonmagnetic member 14, and the slot 16 is kept apart from the nonmagnetic member 14. A through hole is formed in each support portion 20 to allow insertion of the shank of the screw 19 into it. With the through holes aligned with screw holes 26 formed in the upper surface and the lower surface of the slot antenna 8, the screws 19 are inserted from the through hole side and tightened in the screw holes 26, to fix the support portions 20 to the slot antenna 8.

Each fixed portion 22 is formed in a plate shape to be orthogonal to the support portion 20 as illustrated in FIG. 7. A through hole is formed in each fixed portion 22 to allow insertion of the shank of the screw 21 into it. With the through holes aligned with screw holes 28 formed in protruding portions 27 provided on the inner side of the casing 13, the screws 21 are inserted from the through hole side and tightened in the screw holes 28, to fix the fixed portions 22 to the casing 13. That is, when the fixed portions 22 are fixed to the casing 13, a space smaller than the thickness of the nonmagnetic member 14 is produced between the casing 13 and the support portions 20. Consequently, the spacers 15 support the nonmagnetic member 14 such that they press the nonmagnetic member 14 against the inner surface of the casing 13, and support the slot antenna 8 such that they keep the slot 16 apart from the nonmagnetic member 14. The distance by which the slot 16 is separated from the nonmagnetic member 14 is not limited to a particular one, and only needs to be set at least to prevent the slot 16 from contacting the nonmagnetic member 14. In terms of size reduction and in order to prevent entry of dust or the like into the slot 16, it is preferable that the slot 16 is close to the nonmagnetic member 14. For example, the distance is set to some millimeters to some tens of millimeters.

The display 1 according to the first embodiment of the present invention includes the slot antenna 8 for transmitting and receiving data, the nonmagnetic member 14 provided apart from the slot 16 formed in the slot antenna 8 to cover the slot, and the display unit 12 installed in the vehicle T constituting the train 100 and for displaying information on the basis of data received by the slot antenna 8, so that the number of wires in the vehicle T can be reduced and outfitting cost can be reduced. The display 1 includes the slot antenna for transmitting and receiving data, and thus can be installed in a space where a transmission line cannot be disposed. The nonmagnetic member 14 is provided to cover the slot antenna 8, and thus can prevent the entry of dust or the like into the slot 16. If the slot 16 contacts the nonmagnetic member 14 such as glass, the slot antenna 8 will be degraded in antenna characteristics (radio wave intensity). The display 1, in which the nonmagnetic member 14 is provided apart from the slot 16, can thus prevent degradation of the intensity of radio waves emitted from the slot 16 to improve the characteristics of the slot antenna 8. The slot antenna 8 is incombustible, and thus can be suitably used as an in-vehicle wireless communication antenna.

The display 1 according to the first embodiment of the present invention further includes the spacers 15 for supporting the slot antenna 8 while keeping it apart from the nonmagnetic member 14. Thus, even when vibrations occur during the travel of the train 100, for example, the slot 16 can be kept apart from the nonmagnetic member 14, and the characteristics of the slot antenna 8 can be stabilized.

The display 1 according to the first embodiment of the present invention, in which the slot antenna 8 is disposed such that the surface 24 in which the slot 16 is formed has the same orientation as the display surface 23 of the display unit 12 to display information, can thus be designed compactly with little change in the external shape of the conventional display.

The display 1 according to the first embodiment of the present invention, in which the slot antenna 8 is housed in the metal casing 13 and the casing 13 has the opening 17 on the side facing the slot 16, can thus protect the slot antenna 8 from external impact or the like without interfering with the transmission and reception of data. The casing 13 is made of metal, and thus can be prevented from being melted by the heat of fire or the like.

The display 1 according to the first embodiment of the present invention, in which the display unit 12 is housed in the casing 13 together with the slot antenna 8 and the display surface 23 of the display unit 12 to display information is disposed on the opening 17 side, can thus be designed compactly.

The display 1 according to the first embodiment of the present invention, in which the nonmagnetic member 14 is extended to the display surface 23 to be shared as a member for protecting the display surface 23 and is provided to close the opening 17, can thus be reduced in the number of components to be simplified in structure.

The display 1 according to the first embodiment of the present invention, in which the spacers 15 are fixed to the inner portions of the casing 13 and thus are protected by the casing 13 even when receiving an impact or the like from the outside of the casing 13, can thus keep the slot 16 apart from the nonmagnetic member 14 and can stabilize the characteristics of the slot antenna 8.

The display 1 according to the first embodiment of the present invention, in which the region of the nonmagnetic member 14 facing the surface 24 of the slot antenna 8 in which the slot 16 is formed is masked, can thus prevent the slot antenna 8 from being viewed from the outside and can be improved in design.

The in-vehicle display system 200 according to the first embodiment of the present invention, in which the displays 1 transmit and receive data with the slot antennas 8, can thus reduce the number of wires in the vehicle T and can reduce outfitting cost.

The in-vehicle display system 200 according to the first embodiment of the present invention, in which the terminal device 5 installed in the vehicle T is provided and one of the plurality of displays 1 receives data from the terminal device 5 with the slot antenna 8, can thus further reduce the number of wires in the vehicle T.

Figure 8:
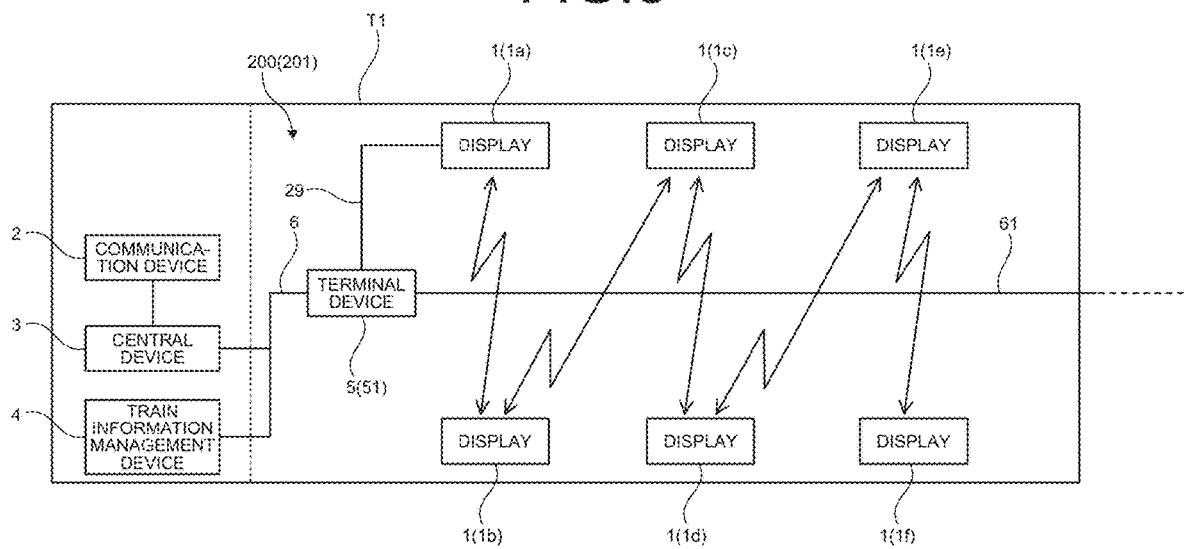
FIG. 8 is a diagram illustrating another example of the flow of data in the vehicle equipped with the in-vehicle wireless displays according to the first embodiment of the present invention.

The flow of data in the vehicle T (T1) equipped with the displays 1 (1a to 1f) according to the first embodiment of the present invention is not limited to the contents illustrated in FIGS. 3 and 4. For example, as in the in-vehicle display system 200 illustrated in FIG. 8, the terminal device 51 may be connected to the display 1a by a transmission line 29 so that data can be transmitted and received between the terminal device 51 and the display 1a via the transmission line 29. The flow of data after the display 1a in this case is the same as that in FIG. 3, and thus will not be described in detail.

Figure 9:
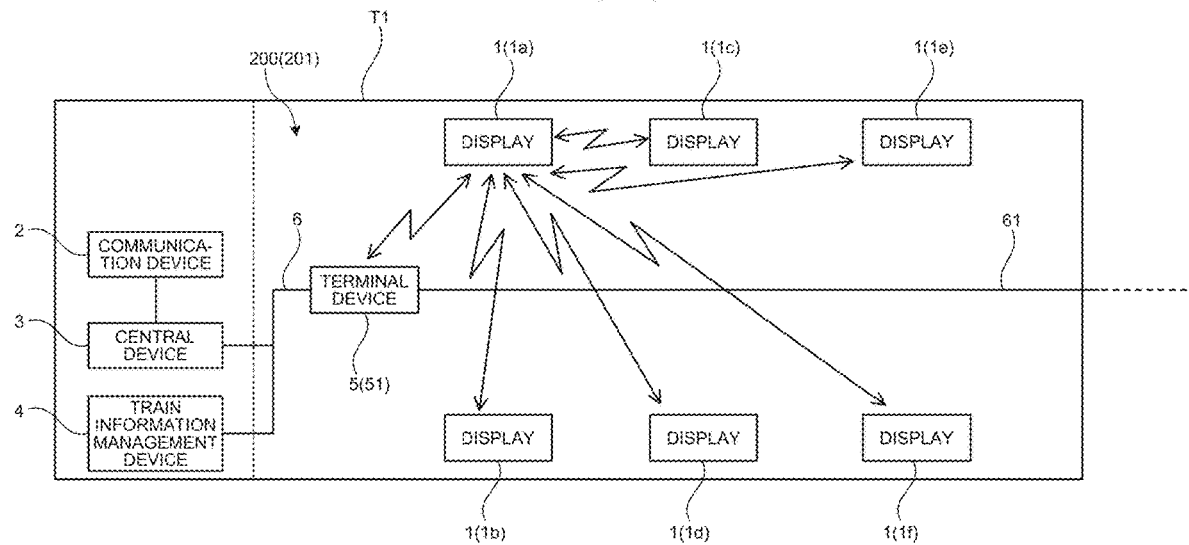
FIG. 9 is a diagram illustrating another example of the flow of data in the vehicle equipped with the in-vehicle wireless displays according to the first embodiment of the present invention.
Figure 10:
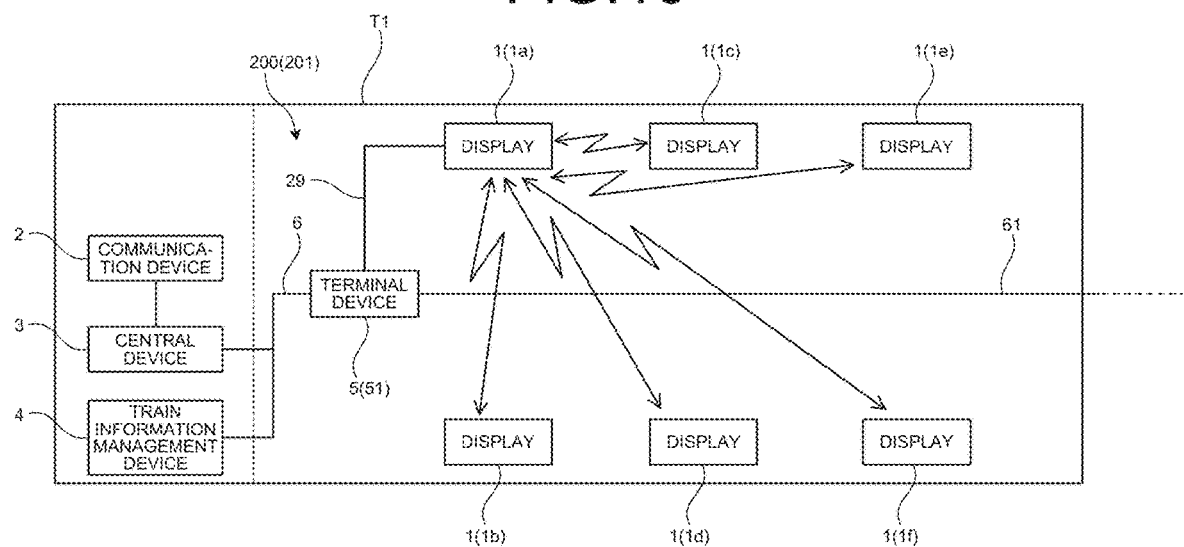
FIG. 10 is a diagram illustrating another example of the flow of data in the vehicle equipped with the in-vehicle wireless displays according to the first embodiment of the present invention.

As in the in-vehicle display system 200 illustrated in FIG. 9, in the vehicle T (T1), the display 1a that has received data with the slot antenna 8 from the terminal device 51 by wireless communication may transmit the data to all the other displays 1b to 1f. In this case, when the displays 1b to 1f receive the data transmitted from the display 1a with the slot antennas 8, they display information on the display units 12 on the basis of the received data. As in the in-vehicle display system 200 illustrated in FIG. 10, in the vehicle T (T1), the terminal device 51 may be connected to the display 1a by the transmission line 29 in FIG. 9 so that data can be transmitted and received between the terminal device 51 and the display 1a via the transmission line 29. The flow of data after the display 1a in this case is the same as that in FIG. 9. In the in-vehicle display system 200, the display 1a may receive data transmitted from the terminal device 51 with the slot antenna 8, and the displays 1a to 1f may transmit and receive data via transmission lines, which is not illustrated in detail in a drawing.

Although FIG. 3 illustrates an example of the case where one display 1 (1a to 1f) is disposed on a lintel of each door of the six-door-type vehicle T1, two displays 1 may be disposed side by side on a lintel of each door.

Figure 11:
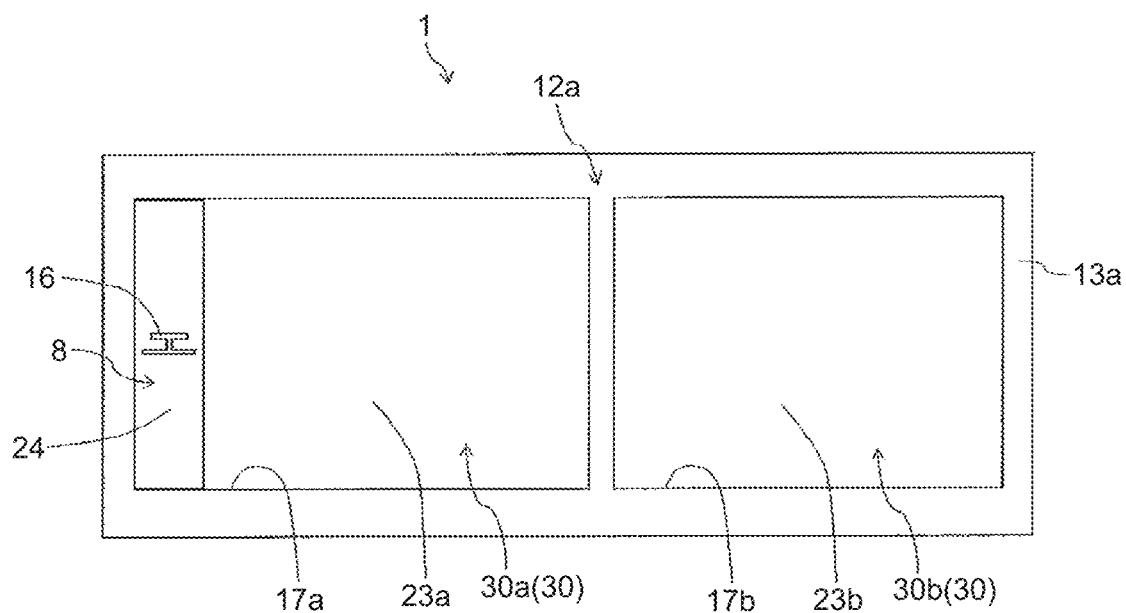
FIG. 11 is a diagram illustrating another example of the appearance of each in-vehicle wireless display according to the first embodiment of the present invention.

As illustrated in FIG. 11, the display 1 according to the first embodiment of the present invention may be configured such that the slot antenna 8 and a display unit 12a including two unit display units 30a and 30b are housed in a casing 13a. The casing 13a includes an opening 17a formed on the side facing a display surface 23a of the unit display unit 30a and the surface 24 of the slot antenna 8 in which the slot 16 is formed, and an opening 17b formed on the side facing a display surface 23b of the unit display unit 30b. To explain the arrangement of the slot antenna 8 and the display unit 12a, FIG. 11 does not illustrate the nonmagnetic member 14 provided to protect the slot 16 of the slot antenna 8 and the display surfaces 23a and 23b of the unit display units 30a and 30b, and close the openings 17a and 17b of the casing 13a.

In the display 1 illustrated in FIG. 11, the slot antenna is disposed at laterally one end of the casing 13a, and the display unit 12a is disposed adjacent to the slot antenna 8 in the casing 13a. The unit display units 30a and 30b are formed, for example, of liquid crystal displays, and are arranged in a row in the direction opposite to the side on which the slot antenna 8 is installed in the casing 13a. When the display 1 receives data with the slot antenna 8 from the terminal device 5 or other displays 1, information is displayed on the unit display units 30a and 30b, on the basis of the received data. Although FIG. 11 illustrates an example in which information is displayed on the two unit display units 30a and 30b housed in the casing 13a, on the basis of data received by the slot antenna 8, the number of unit display units 30 is not limited to two, and may be three or more.

Thus, the display 1 according to the first embodiment of the present invention as illustrated in FIG. 11, in which the display unit 12a is disposed adjacent to the slot antenna 8 and includes a plurality of unit display units 30 arranged in a row in the direction opposite to the side on which the slot antenna 8 is installed, can thus display information on the plurality of unit display units 30.

Second Embodiment

Next, the schematic structure of the display 1 according to a second embodiment of the present invention will be described with reference to FIGS. 12 to 14. As illustrated in FIG. 13, the display 1 according to the second embodiment of the present invention has the slot antenna 8 disposed outside the casing 13 in which the display unit 12 is housed. Note that the same reference numerals are assigned to the same components and the like as those of the display 1 according to the first embodiment of the present invention without detailed explanations thereof.

Figure 12:
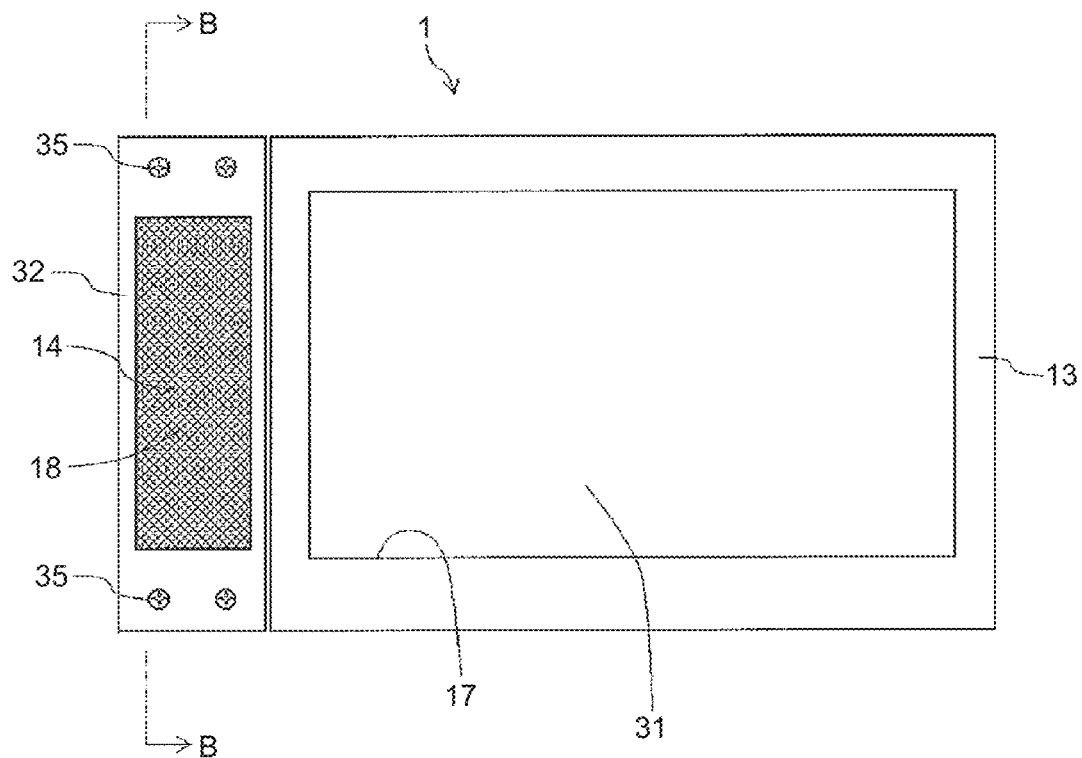
FIG. 12 is a diagram illustrating an example of the appearance of the in-vehicle wireless display according to a second embodiment of the present invention.
Figure 13:
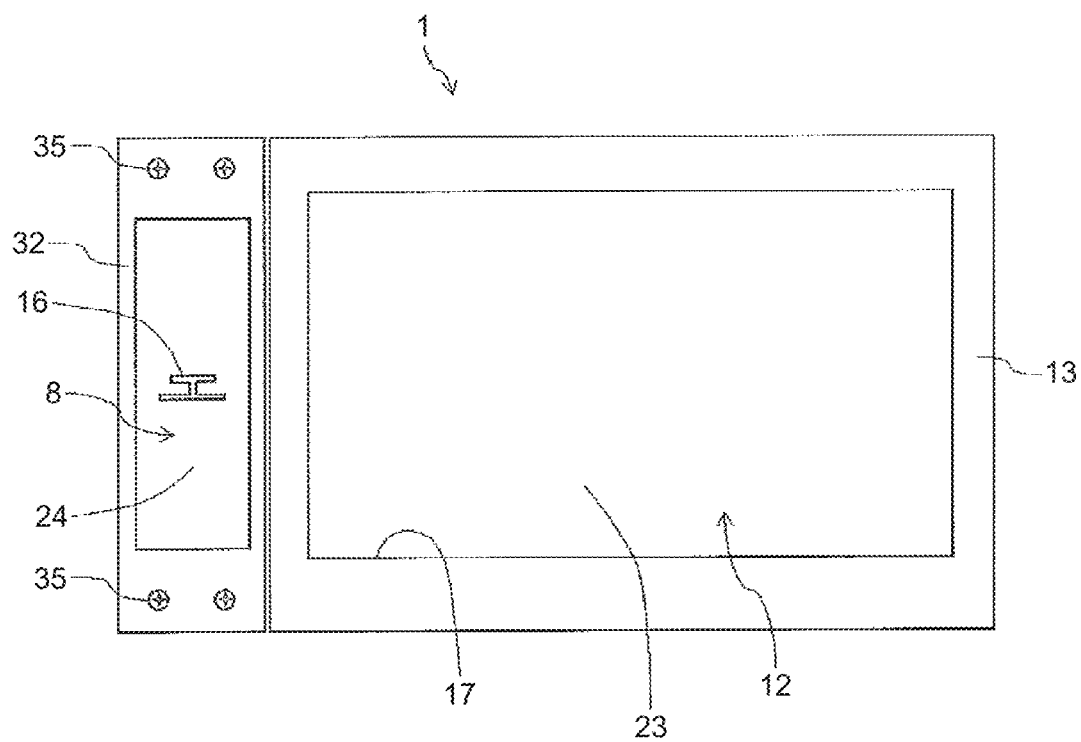
FIG. 13 is a diagram illustrating an example of the appearance of the in-vehicle wireless display according to the second embodiment of the present invention, with a nonmagnetic member removed.
Figure 14:
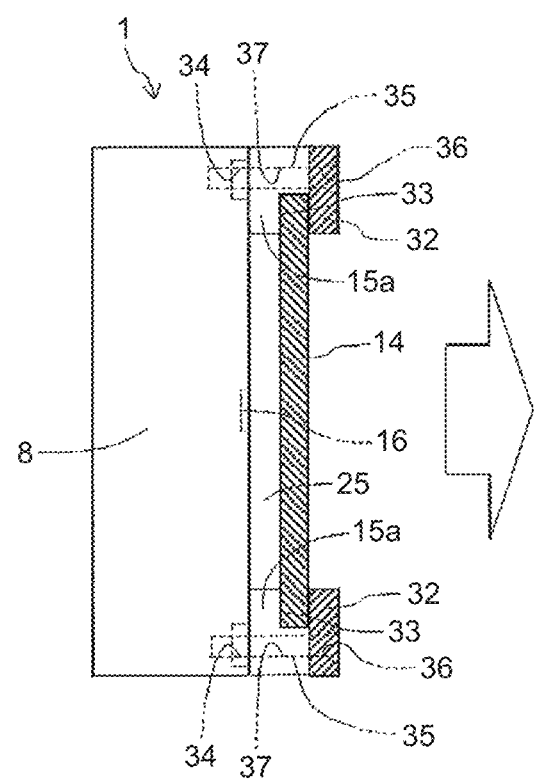
FIG. 14 is a cross-sectional view illustrating an example of the internal structure of the in-vehicle wireless display according to the second embodiment of the present invention.

As illustrated in FIGS. 12 to 14, the display 1 according to the second embodiment of the present invention includes the display unit 12, the casing 13 housing the display unit 12, a nonmagnetic member 31 closing the opening 17 of the casing 13, the slot antenna 8, the nonmagnetic member 14 covering the slot 16 of the slot antenna 8, a fixing member 32 for fixing the nonmagnetic member 14, and spacers 15a. FIG. 14 is a cross-sectional view taken along line B-B in FIG. 12, and illustrates an example of the internal structure of the display 1.

As illustrated in FIG. 13, the casing 13 houses the display unit 12, and has the opening 17 formed on the side facing the display surface 23 of the display unit 12. The opening 17 is closed by the nonmagnetic member 31 made of tempered glass or the like for protecting the display surface 23.

The slot antenna 8 is disposed side by side with the casing 13 in which the display unit 12 is housed as illustrated in FIGS. 12 and 13. As illustrated in FIG. 14, the nonmagnetic member 14 is provided apart from the slot 16 of the slot antenna 8 to cover the slot 16. The masked portion 18 that has been subjected to masking is formed on a region of the nonmagnetic member 14 facing a surface of the slot antenna 8 in which the slot 16 is formed as indicated by hatching in FIG. 12. In FIG. 14, the masked portion 18 is not illustrated.

The fixing member 32 is for fixing the nonmagnetic member 14 and is formed in a rectangular frame shape as illustrated in FIGS. 12 and 13. As illustrated in FIG. 14, the spacers 15a are for supporting the slot antenna 8 such that the slot 16 is kept apart from the nonmagnetic member 14, and are disposed to be located between the surface 24 of the slot antenna 8 in which the slot 16 is formed and the fixing member 32. The spacers 15a are provided as a pair on the upper side and the lower side of the surface 24 of the slot antenna 8 in which the slot 16 is formed. A step portion 33 having a dimension equal to the thickness of the nonmagnetic member 14 is formed in a surface of each spacer 15a located on the fixing member 32 side.

The fixing member 32 and the spacers 15a have through holes 36 and 37, respectively, into which the shanks of fixing screws 35 can be inserted, formed in positions facing screw holes 34 provided in the surface 24 of the slot antenna 8 in which the slot 16 is formed. As illustrated in FIG. 14, by the screws 35 being inserted from the through hole 36 side of the fixing member 32, passed through the through holes 37 formed in the spacers 15a, and tightened in the screw holes 34 in the slot antenna 8, the nonmagnetic member 14 is fixed with the upper end and the lower end sandwiched between the step portions 33 and the fixing member 32. Consequently, the space 25 is provided between the surface 24 in which the slot 16 is formed and the inner surface of the nonmagnetic member 14, and the slot 16 is kept apart from the nonmagnetic member 14. Although the display 1 in FIGS. 12 to 14 shows an example in which the slot antenna 8 is disposed to the side of the casing 13 in which the display unit 12 is housed, the slot antenna 8 may be disposed apart from the casing 13.

The present invention is not limited to the above embodiments. The embodiments can be modified or omitted as appropriate without departing from the scope of the concept of the present invention.

REFERENCE SIGNS LIST 1, 1a to 1d in-vehicle wireless display; 5 terminal device; 8 slot antenna; 12 display unit; 13, 13a, 13b casing; 14 nonmagnetic member; 15, 15a spacer; 16 slot; 17, 17a, 17b opening; 23 display surface; 24 surface in which slot is formed; 30, 30a, 30b unit display unit; 100 train; T, T1 to Tn vehicle.

The invention claimed is:

1. An in-vehicle wireless display, comprising:
a slot antenna to transmit and receive data;
a nonmagnetic member provided apart from a slot formed in the slot antenna, to cover the slot; and
a display installed in a vehicle constituting a train, to display information on a basis of data received by the slot antenna, wherein
the slot antenna is disposed such that a surface in which the slot is formed has a same orientation as a display surface of the display to display the information.

2. The in-vehicle wireless display according to claim 1, further comprising a spacer to support the slot antenna such that the slot antenna is kept apart from the nonmagnetic member.

3. The in-vehicle wireless display according to claim 1, wherein the nonmagnetic member has a masked region facing a surface of the slot antenna in which the slot is formed.

4. The in-vehicle wireless display according to claim 1, wherein the display is disposed adjacent to the slot antenna, and includes a plurality of unit displays disposed in a row in a direction opposite to a side on which the slot antenna is installed.

5. An in-vehicle wireless display, comprising:
a slot antenna to transmit and receive data;
a nonmagnetic member provided apart from a slot formed in the slot antenna, to cover the slot;
a display installed in a vehicle constituting a train, to display information on a basis of data received by the slot antenna; and
a metal casing to house the slot antenna,
wherein the metal casing has an opening on a side facing the slot, and
wherein the nonmagnetic member is extended to a display surface of the display to be shared as a member to protect the display surface, and is provided to close the opening.

6. The in-vehicle wireless display according to claim 5, wherein
the display is housed in the metal casing together with the slot antenna, and
the display surface of the display to display the information is disposed on a side where the opening is present.

7. The in-vehicle wireless display according to claim 5, further comprising a spacer to support the slot antenna such that the slot antenna is kept apart from the nonmagnetic member.

8. The in-vehicle wireless display according to claim 7, wherein the spacer is fixed to an inner portion of the metal casing.

9. The in-vehicle wireless display according to claim 5, wherein the nonmagnetic member has a masked region facing a surface of the slot antenna in which the slot is formed.

10. The in-vehicle wireless display according to claim 5, wherein the display is disposed adjacent to the slot antenna, and includes a plurality of unit displays disposed in a row in a direction opposite to a side on which the slot antenna is installed.

11. An in-vehicle wireless display, comprising:

a slot antenna to transmit and receive data;

a nonmagnetic member provided apart from a slot formed in the slot antenna, to cover the slot;

a display installed in a vehicle constituting a train, to display information on a basis of data received by the slot antenna;

a fixing member to fix the nonmagnetic member; and a spacer to support the slot antenna such that the slot antenna is kept apart from the nonmagnetic member, wherein the spacer is disposed to be located between a surface of the slot antenna in which the slot is formed and the fixing member, a step portion is formed in a surface of the spacer located on a side where the fixing member is present, and the nonmagnetic member is fixed such that the nonmagnetic member is the sandwiched between the step portion and the fixing member.

12. An in-vehicle display system comprising:

the in-vehicle wireless display according to claim 1; and a terminal device installed in the vehicle, wherein the in-vehicle wireless display receives the data from the terminal device with the slot antenna.

13. The in-vehicle display system according to claim 12, wherein the system comprises a plurality of the in-vehicle wireless displays, and the in-vehicle wireless displays transmit and receive the data with the respective slot antennas.

14. An in-vehicle display system comprising:

the in-vehicle wireless display according to claim 5; and a terminal device installed in the vehicle, wherein the in-vehicle wireless display receives the data from the terminal device with the slot antenna.

15. The in-vehicle display system according to claim 14, wherein the system comprises a plurality of the in-vehicle wireless displays, and the in-vehicle wireless displays transmit and receive the data with the respective slot antennas.

16. An in-vehicle display system comprising:

the in-vehicle wireless display according to claim 11; and a terminal device installed in the vehicle, wherein the in-vehicle wireless display receives the data from the terminal device with the slot antenna.

17. The in-vehicle display system according to claim 16, wherein the system comprises a plurality of the in-vehicle wireless displays, and the in-vehicle wireless displays transmit and receive the data with the respective slot antennas.

* * * * *